US012581514B2

(12) United States Patent
Leon Calvo et al.

(10) Patent No.: US 12,581,514 B2
(45) Date of Patent: Mar. 17, 2026

(54) METHODS FOR INTER-UE RESOURCE COORDINATION MECHANISM

(71) Applicant: Telefonaktiebolaget LM Ericsson (publ), Stockholm (SE)

(72) Inventors: Jose Angel Leon Calvo, Aachen (DE); Hieu Do, Järfälla (SE); Shehzad Ali Ashraf, Aachen (DE); Ricardo Blasco Serrano, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 358 days.

(21) Appl. No.: 18/032,669

(22) PCT Filed: Oct. 22, 2021

(86) PCT No.: PCT/SE2021/051065
§ 371 (c)(1),
(2) Date: Apr. 19, 2023

(87) PCT Pub. No.: WO2022/086428
PCT Pub. Date: Apr. 28, 2022

(65) Prior Publication Data
US 2023/0389051 A1      Nov. 30, 2023

Related U.S. Application Data

(60) Provisional application No. 63/104,622, filed on Oct. 23, 2020.

(51) Int. Cl.
*H04W 72/40*        (2023.01)
*H04B 17/318*       (2015.01)
(Continued)

(52) U.S. Cl.
CPC .......... *H04W 72/40* (2023.01); *H04B 17/328* (2023.05); *H04W 72/25* (2023.01); *H04W 72/563* (2023.01)

(58) Field of Classification Search
CPC ... H04W 72/40; H04W 72/25; H04W 72/563; H04B 17/328
See application file for complete search history.

(56) References Cited

U.S. PATENT DOCUMENTS

| | | | |
|---|---|---|---|
| 2017/0188391 A1 | 6/2017 | Rajagopal et al. | |
| 2018/0234911 A1 | 8/2018 | Zhao et al. | |
| (Continued) | | | |

FOREIGN PATENT DOCUMENTS

| | | |
|---|---|---|
| CN | 11233366 A | 2/2021 |
| CN | 112333661 A | 2/2021 |
| (Continued) | | |

OTHER PUBLICATIONS

Author Unknown, "Technical Specification Group Services and System Aspects; Architecture enhancements for 5G System (5GS) to support Vehicle-to-Everything (V2X) services (Release 16)," Technical Specification 23.287, Version 16.4.0, Sep. 2020, 3GPP Organizational Partners, 58 pages.

(Continued)

*Primary Examiner* — Won Tae C Kim
(74) *Attorney, Agent, or Firm* — Withrow & Terranova, PLLC

(57) ABSTRACT

Methods for enabling inter-User Equipment (UE) resource coordination are provided. More specifically, methods performed by a receiving device and a transmitting device for enabling inter-UE resource coordination are provided. The methods disclosed herein can help achieve a sound tradeoff between benefits of resource coordination and overhead associated with resource coordination. Specifically, the methods can help reduce network load and ineffective resource coordination message, obtain better suggestion in terms of rules and formats of the resource coordination (Continued)

message, and create a framework for combining different types of resource coordination formats.

10 Claims, 9 Drawing Sheets

(51) Int. Cl.
H04W 72/25 (2023.01)
H04W 72/563 (2023.01)

(56) References Cited

U.S. PATENT DOCUMENTS

| | | | |
|---|---|---|---|
| 2019/0306835 A1 | 10/2019 | Hoang et al. | |
| 2020/0068609 A1 | 2/2020 | Wang et al. | |
| 2020/0314916 A1 | 10/2020 | Park et al. | |
| 2021/0105817 A1* | 4/2021 | Nguyen | H04B 17/27 |
| 2021/0352679 A1 | 11/2021 | Baghel et al. | |
| 2021/0400650 A1* | 12/2021 | Shilov | H04W 4/40 |
| 2022/0182866 A1* | 6/2022 | Lee | H04L 5/0064 |
| 2022/0322359 A1* | 10/2022 | Ye | H04W 72/563 |
| 2023/0156776 A1* | 5/2023 | Kupanna Subramani | H04W 4/46 370/329 |
| 2023/0262774 A1* | 8/2023 | Wu | H04W 28/0284 370/329 |
| 2023/0309134 A1* | 9/2023 | Leon Calvo | H04W 72/563 |

FOREIGN PATENT DOCUMENTS

| | | |
|---|---|---|
| EP | 2975792 A1 | 1/2016 |
| WO | 2015065130 A1 | 5/2015 |
| WO | 2020011336 A1 | 1/2020 |
| WO | 2022010410 A1 | 1/2022 |

OTHER PUBLICATIONS

Author Unknown, "Technical Specification Group Radio Access Network; NR; Physical channels and modulation (Release 16)," Technical Specification 38.211, Version 16.3.0, Sep. 2020, 3GPP Organizational Partners, 133 pages.

Author Unknown, "Technical Specification Group Radio Access Network; NR; Multiplexing and channel coding (Release 16)," Technical Specification 38.212, Version 16.3.0, Sep. 2020, 3GPP Organizational Partners, 152 pages.

Author Unknown, "Technical Specification Group Radio Access Network; NR; Physical layer procedures for control (Release 16)," Technical Specification 38.213, Version 16.3.0, Sep. 2020, 3GPP Organizational Partners, 179 pages.

Author Unknown, "Technical Specification Group Radio Access Network; NR; Physical layer procedures for data (Release 16)," Technical Specification 38.214, Version 16.3.0, Sep. 2020, 3GPP Organizational Partners, 166 pages.

Author Unknown, "Technical Specification Group Radio Access Network; NR; Medium Access Control (MAC) protocol specification (Release 16)," Technical Specification 38.321, Version 16.2.0, Sep. 2020, 3GPP Organizational Partners, 154 pages.

Author Unknown, "Technical Specification Group Radio Access Network; NR; Radio Resource Control (RRC) protocol specification (Release 16)," Technical Specification 38.331, Version 16.2.0, Sep. 2020, 3GPP Organizational Partners, 921 pages.

Catt, et al., "R1-2100352: Discussion on feasibility and benefits for mode 2 enhancements," 3GPP TSG RAN WG1 meeting #104-e, Jan. 25-Feb. 5, 2021, Electronic Meeting, 9 pages.

LG Electronics, "RP-193231: New WID on NR sidelink enhancement," 3GPP TSG RAN Meeting #86, Dec. 9-12, 2019, Sitges, Spain, 6 pages.

International Search Report and Written Opinion for International Patent Application No. PCT/SE2021/051065, mailed Dec. 2, 2021, 12 pages.

Author Unknown, "Technical Specification Group Radio Access Network; Study on evaluation methodology of new Vehicle-to-Everything (V2X) use cases for LTE and NR; (Release 15)," Technical Report 37.885, Version 15.3.0, Jun. 2019, 3GPP Organizational Partners, 38 pages.

Author Unknown, "Technical Specification Group Radio Access Network; NR; Physical layer procedures for data (Release 16)," Technical Specification 38.214, Version 16.1.0, Mar. 2020, 3GPP Organizational Partners, 151 pages.

Author Unknown, "Technical Specification Group Radio Access Network; NR; Radio Resource Control (RRC) protocol specification (Release 16)," Technical Specification 38.331, Version 16.1.0, Jul. 2020, 3GPP Organizational Partners, 906 pages.

CAICT, "R1-2104725: Considerations on mode2 enhancements," 3GPP TSG RAN WG1 Meeting #105e, May 10-27, 2021, Electronic Meeting, 4 pages.

CAICT, "R1-2109349: Considerations on mode2 enhancements," 3GPP TSG RAN WG1 Meeting #106b-e, Oct. 11-19, 2021, Electronic Meeting, 8 pages.

CATT, et al., "R1-2104490: Discussion on inter-UE coordination for Mode 2 enhancements," 3GPP TSG RAN WG1 meeting #105-e, May 19-27, 2021, Electronic Meeting, 7 pages.

Ericsson, "R1-2103705: Mode 2 enhancements using Inter-UE coordination," 3GPP TSG RAN WG1 #104b-e, Apr. 12-20, 2021, Electronic Meeting, 15 pages.

LG Electronics, "RP-202846: WID revision: NR sidelink enhancement," 3GPP TSG RAN Meeting #90e, Dec. 7-11, 2020, Electronic Meeting, 6 pages.

VIVO, "R1-2106200: Discussion on mode 2 enhancements," 3GPP TSG RAN WG1 #105-e, May 10-27, 2021, Electronic Meeting, 11 pages.

International Search Report and Written Opinion for International Patent Application No. PCT/SE2021/050710, mailed Nov. 5, 2021, 10 pages.

International Search Report and Written Opinion for International Patent Application No. PCT/SE2022/050741, mailed Oct. 5, 2022, 11 pages.

* cited by examiner

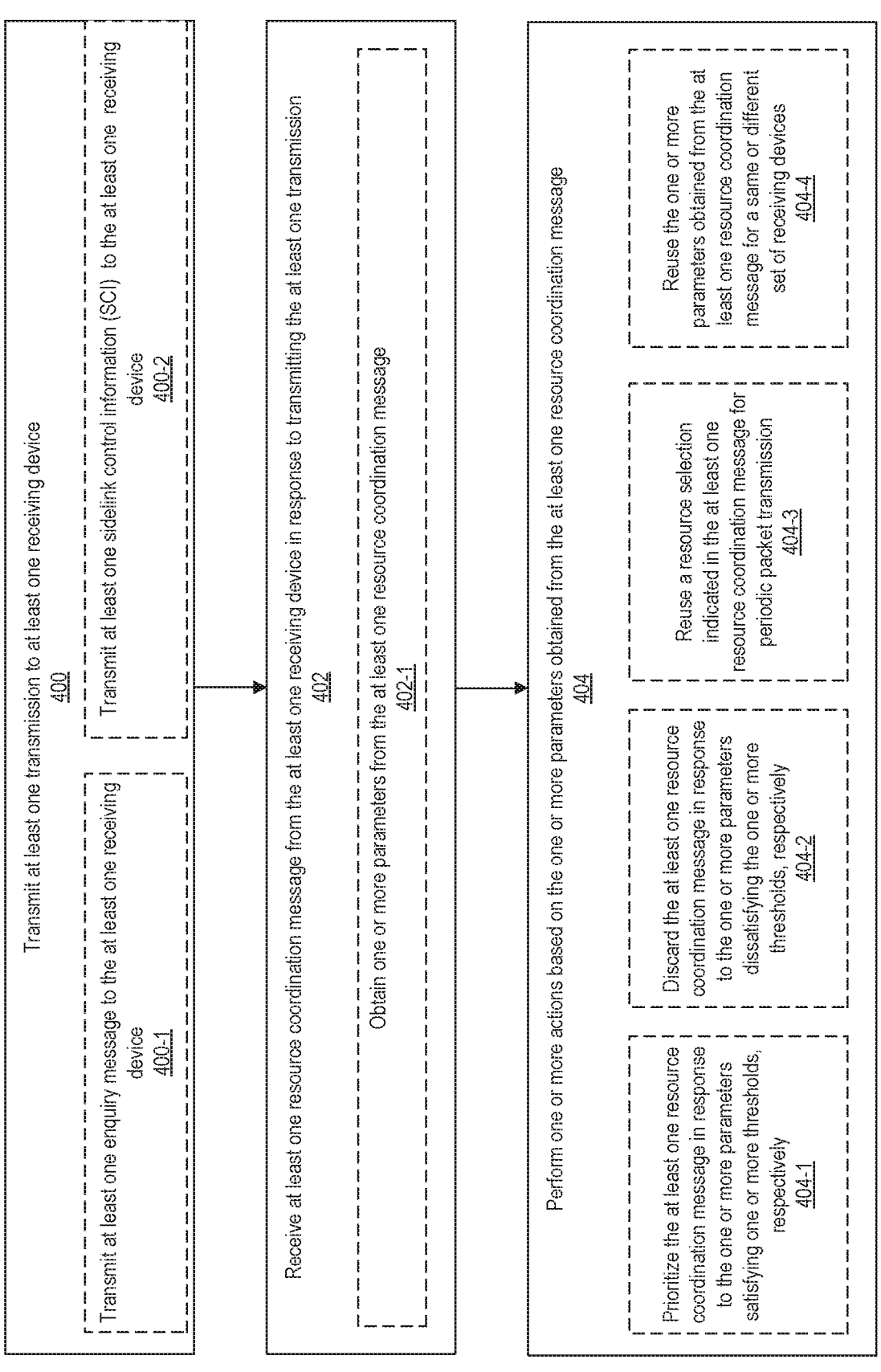

FIG. 4

Transmit at least one transmission to at least one receiving device
400

Transmit at least one enquiry message to the at least one receiving device
400-1

Transmit at least one sidelink control information (SCI) to the at least one receiving device
400-2

Receive at least one resource coordination message from the at least one receiving device in response to transmitting the at least one transmission
402

Obtain one or more parameters from the at least one resource coordination message
402-1

Perform one or more actions based on the one or more parameters obtained from the at least one resource coordination message
404

Prioritize the at least one resource coordination message in response to the one or more parameters satisfying one or more thresholds, respectively
404-1

Discard the at least one resource coordination message in response to the one or more parameters dissatisfying the one or more thresholds, respectively
404-2

Reuse a resource selection indicated in the at least one resource coordination message for periodic packet transmission
404-3

Reuse the one or more parameters obtained from the at least one resource coordination message for a same or different set of receiving devices
404-4

METHODS FOR INTER-UE RESOURCE COORDINATION MECHANISM

RELATED APPLICATIONS

This application is a 35 U.S.C. § 371 national phase filing of International Application No. PCT/SE2021/051065, filed Oct. 22, 2021, which claims the benefit of provisional patent application Ser. No. 63/104,622, filed Oct. 23, 2020, the disclosures of which are hereby incorporated herein by reference in their entireties.

TECHNICAL FIELD

The technology of the disclosure relates generally to Inter-User Equipment (Inter-UE) resource coordination.

BACKGROUND

Third Generation Partnership Project (3GPP) specified Proximity Services (ProSe) for Long-Term Evolution (LTE) in Releases 12 and 13, targeting public safety use cases (e.g., first responders) as well as a small subset of commercial use cases (e.g., discovery). The main novelty of ProSe was the introduction of Device-to-Device (D2D) communications using a Sidelink (SL) interface. In 3GPP Rel-14 and Rel-15, major changes were introduced to the LTE SL framework with the aim of supporting Vehicle-to-Everything or Vehicle-to-Anything (V2X) communications, where V2X collectively denotes communication between vehicle to any other endpoint (e.g., a vehicle, a pedestrian, etc.). The feature targeted mostly basic V2X use cases such as day-1 safety, etc.

In Rel-16, 3GPP worked on specifying the SL interface for the 5G New Radio (NR). The NR SL in Rel-16 mainly targets advanced V2X services, which can be categorized into four use case groups: vehicles platooning, extended sensors, advanced driving, and remote driving. The advanced V2X services require a new SL in order to meet the stringent requirements in terms of latency and reliability. The NR SL is designed to provide higher system capacity and better coverage, and to allow for an easy extension to support the future development of further advanced V2X services and other related services.

Given the V2X services targeted by NR SL, it is commonly recognized that groupcast/multicast and unicast transmissions are desired. In this regard, the intended receiver of a message includes only a subset of the vehicles in proximity to the transmitter (groupcast) or a single vehicle (unicast). For example, in the platooning service, certain messages are only of interest to the members of the platoon, thus making the members of the platoon natural candidates for groupcast. In another example, the see-through use case most likely involves only a pair of vehicles, for which unicast transmissions naturally fit. Therefore, NR SL not only supports broadcast as in LTE SL, but also groupcast and unicast transmissions. Like in LTE SL, the NR SL is designed to operate with and without network coverage and with varying degree of interaction between the User Equipment (UEs) and the Network (NW), including support for standalone, network-less operation.

In Rel-17, 3GPP is working on multiple enhancements for the SL with the aim of extending the support for V2X and to cover other Use Cases (UCs) such as public safety. Among these UCs, improving the performance of power limited UEs (e.g., pedestrian UEs, first responder UEs, etc.) and improving the performance using resource coordination are considered critical.

Resource Allocation for SL Transmissions

Like in LTE SL, there are two resource allocation modes for NR SL:

Network-based resource allocation, in which the network selects resources and other transmit parameters used by SL UEs. In some cases, the network may control every single transmission parameter. In other cases, the network may select the resources used for transmission but may give a transmitter the freedom to select some of the transmission parameters, possibly with some restrictions. In the context of NR SL, 3GPP refers to this resource allocation mode as Mode 1.

Autonomous resource allocation, in which UEs autonomously select resources and other transmit parameters. In this mode, there may be no intervention by the network (e.g., out of coverage, unlicensed carriers without a network deployment, etc.) or very minimal intervention by the network (e.g., configuration of pools of resources, etc.). In the context of NR SL, 3GPP refers to this resource allocation mode as Mode 2.

Physical SL Channels

In NR SL, different physical SL channels are defined.

Physical Sidelink Control Channel (PSCCH): This is used to carry (part of) Sidelink Control Information (SCI), which is also termed as first stage SCI. The first stage SCI carries the resource allocation information that is essential to decode for performing sensing-based resource allocation (i.e., mode-2)

Physical Sidelink Shared Channel (PSSCH): This is used to carry actual data transmission. Also, a part of SCI, also termed as second stage SCI, is carried over PSSCH.

Physical Sidelink Feedback Channel (PSFCH): This is used to carry the Hybrid Automatic Repeat Request (HARQ) feedback information such as HARQ-ACK or HARQ-NACK. In Rel. 16, only sequence based PSFCH is supported.

Physical Sidelink Broadcast Channel (PSBCH): This is used to carry the system information, which is used to perform SL transmissions.

SCI Formats

In NR SL, the SCI is divided into two different stages. The first stage (with one format denoted in the specification as SCI format 1-A) is included in the PSCCH and the second stage (with two different formats denoted in the specifications as SCI-2A and SCI-B) is carried by PSSCH. The format of each of the stages is defined in [section 8.3, TS 38.213] and [section 8.4, TS 38.213] and the specific text is reproduced below for reference:

8.3.1.1 SCI Format 1-A

SCI format 1-A is used for the scheduling of PSSCH and 2nd-stage-SCI on PSSCH The following information is transmitted by means of the SCI format 1-A:

Priority—3 bits as specified in clause 5.4.3.3 of [12, TS 23.287] and clause 5.22.1.3.1 of [8, TS 38.321].

Frequency resource assignment—

$$\left\lceil \log_2\left( \frac{N_{subChannel}^{SL}\left(N_{subChannel}^{SL}+1\right)}{2} \right) \right\rceil$$

bits when the value of the higher layer parameter sl-MaxNumPerReserve is configured to 2; otherwise $$\left\lceil \log_2\left( \frac{N_{subChannel}^{SL}\left(N_{subChannel}^{SL}+1\right)\left(2N_{subChannel}^{SL}+1\right)}{6} \right) \right\rceil$$

bits when the value of the higher layer parameter sl-MaxNumPerReserve is configured to 3, as defined in clause 8.1.2.2 of [6, TS 38.214].

Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.2.1 of [6, TS 38.214].

Resource Reservation Period (RSRP)—[$\log_2 N_{rsv\_period}$] bits as defined in clause 8.1.4 of [6, TS 38.214], where $N_{rsv\_period}$ is the number of entries in the higher layer parameter sl-ResourceReservePeriodList, if higher layer parameter sl-MultiReserveResource is configured; 0 bit otherwise.

Demodulation Reference Signal (DMRS) pattern—[$\log_2 N_{pattern}$] bits as defined in clause 8.4.1.1.2 of [4, TS 38.211], where $N_{pattern}$ is the number of DMRS patterns configured by higher layer parameter sl-PSFCH-DMRS-TimePatternList $2^{nd}$-stage SCI format—2 bits as defined in Table 8.3.1.1-1.

Beta_offset indicator—2 bits as provided by higher layer parameter sl-BetaOffsets2ndSCI and Table 8.3.1.1-2.

Number of DMRS port—1 bit as defined in Table 8.3.1.1-3.

Modulation and Coding Scheme (MCS)—5 bits as defined in clause 8.1.3 of [6, TS 38.214].

Additional MCS table indicator—as defined in clause 8.1.3.1 of [6, TS 38.214]: 1 bit if one MCS table is configured by higher layer parameter sl-Additional-MCS-Table, 2 bits if two MCS tables are configured by higher layer parameter sl-Additional-MCS-Table, 0 bit otherwise.

PSFCH overhead indication—1 bit as defined clause 8.1.3.2 of [6, TS 38.214] if higher layer parameter sl-PSFCH-Period=2 or 4; 0 bit otherwise.

Reserved—a number of bits as determined by higher layer parameter sl-NumReservedBits, with value set to zero.

8.4.1.1 SCI format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits as defined in clause 16.4 of [5, TS 38.213].

New data indicator—1 bit as defined in clause 16.4 of [5, TS 38.213].

Redundancy version—2 bits as defined in clause 16.4 of [6, TS 38.214].

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Cast type indicator—2 bits as defined in Table 8.4.1.1-1.

CSI request—1 bit as defined in clause 8.2.1 of [6, TS 38.214].

8.4.1.2 SCI Format 2-B

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits as defined in clause 16.4 of [5, TS 38.213].

New data indicator—1 bit as defined in clause 16.4 of [5, TS 38.213].

Redundancy version—2 bits as defined in clause 16.4 of [6, TS 38.214].

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Zone ID—12 bits as defined in clause 5.8.11 of [9, TS 38.331].

Communication range requirement—4 bits determined by higher layer parameter sl-ZoneConfigMCR-Index.

Groupcast Modes

In case of groupcast, NR supports two types of HARQ mechanisms:

Option 1: When only NACK is transmitted in case of failed PSSCH decoding.

Option 2: When ACK is transmitted if PSSCH is successfully decoded or NACK is transmitted in case of failed PSSCH decoding.

Option 1 has the issue that there is no way for a transmitter UE to distinguish between failed PSCCH and successful data transmission. However, in this case, it is reasonable that the TX UE assumes that the PSSCH has been successfully decoded if no NACK is received. Option 1 is particularly useful to limit unnecessary transmissions and hence the congestion in the network. It is to be noted that the use of each option in NR is made (pre-)configurable and depends on the scenario.

Related to the groupcast modes and included in the SCI content as Cast Type Indicator, the different unicast, groupcast and broadcast types are indicated as shown in the table below:

5

TABLE 8.4.1.1-1

| | Cast type indicator | |
| --- | --- | --- |
| Value of Cast type indicator | Cast type | |
| 00 | Broadcast | |
| 01 | Groupcast when HARQ-ACK information includes ACK or NACK | |
| 10 | Unicast | |
| 11 | Groupcast when HARQ-ACK information includes only NACK | |

Configuration, Pre-Configuration, and Predefinition of Parameters

To operate SL, different parameters are used. These parameters may be provided to a UE in different ways:

The parameters may be configured by a network node (e.g., a gNB). Configuration may be received using dedicated or broadcast signaling, for example using a System Information Block (SIB) or Radio Resource Control (RRC) signaling. This is typically used when the UE is in coverage of a gNB for a given frequency.

The parameters may be preconfigured in the UE. In this case, the pre-configuration is stored in the UE, typically in the Subscriber Identification Module (SIM) card. This is typically used when the UE is not in coverage for a given frequency.

The parameters may be predefined or defined in a specification.

In this disclosure, the term (pre-)configuration includes any of configuration and pre-configuration.

Inter-UE Coordination Mechanism

In this framework, a Transmitting (TX) UE receives a resource coordination message (with or without previously sending an enquiry message) to boost/improve the TX UE's own resource selection as shown in FIG. 1. Based on the resource coordination message, the TX UE then performs resource (re-)selection. That is, considering the information a UE receives in the coordination message, the UE selects the (optimum) resource(s) for the UE's own transmission. In case the UE has already selected the resource(s), the UE may either keep the same resource(s) as selected previously in case the selected resource(s) still considered suitable for transmission or selects another resource(s) in case the earlier selected resource(s) is not suitable for transmission based on the received coordination message.

Moreover, the coordination message can either include a set of resources (e.g., a resource map indicating suitable/unsuitable resources), which is referred to as map-based coordination message hereinafter, or a flag (e.g., one-bit signal) indicating the UE to perform a re-selection of the resources selected for transmission, which is referred to as flag-based coordination message hereinafter.

SUMMARY

Embodiments disclosed herein include methods for enabling inter-User Equipment (UE) resource coordination. More specifically, methods performed by a receiving device and a transmitting device for enabling inter-UE resource coordination are provided. The methods disclosed herein can help achieve a sound tradeoff between benefits of resource coordination and overhead associated with resource coordination. Specifically, the methods can help reduce a network load and an ineffective resource coordination message, obtain better suggestion in terms of rules and formats of the resource coordination message, and create a framework for combining different types of resource coordination formats.

In an embodiment, a method performed by a receiving device for enabling inter-UE resource coordination is provided. The method includes receiving one or more transmissions from one or more transmitting devices. The method also includes determining whether to communicate a resource coordination message to a respective one of the one or more transmitting devices based on one or more parameters obtained from a respective one of the one or more transmissions received from the respective one of the one or more transmitting devices. The method also includes determining a format for the resource coordination message based on the one or more obtained parameters in response to determining to communicate the resource coordination message. The method also includes transmitting the resource coordination message to the respective one of the one or more transmitting devices in the determined format.

In an embodiment, receiving the one or more transmissions from the one or more transmitting devices comprises one or more of: receiving one or more enquiry messages from the one or more transmitting devices and receiving one or more Sidelink Control Information, SCIs, from the one or more transmitting devices.

In an embodiment, the one or more transmissions comprise multiple transmissions and receiving the one or more transmissions from the one or more transmitting devices further includes receiving the multiple transmissions from multiple transmitting devices, prioritizing the multiple transmissions based on one or more of: a respective priority indicated in each of the multiple transmissions, a respective target communication range indicated in each of the multiple transmissions, and a respective Reference Signal Received Power, RSRP, of a physical channel carrying each of the multiple transmissions, and prioritizing multiple resource coordination messages for the multiple transmitting devices to thereby avoid potential collision among the multiple resource coordination messages based on one or more of: the respective target communication range indicated in each of the multiple transmissions and the respective RSRP of the physical channel carrying each of the multiple transmissions.

In an embodiment, the multiple transmissions are received from the multiple transmitting devices during a pre-defined time period.

In an embodiment, the one or more transmissions are received in a unicast mode, a groupcast mode, or a broadcast mode.

In an embodiment, determining whether to communicate the resource coordination message comprises determining to communicate the resource coordination message in response to receiving the respective one of the one or more transmissions in a unicast mode.

In an embodiment, determining whether to communicate the resource coordination message further comprises determining to communicate the resource coordination message in response to the receiving device being within a target communication range indicated by the respective one of the one or more transmissions.

In an embodiment, the one or more parameters obtained from the respective one of the one or more transmissions comprises one or more of: a Sidelink-Reference Signal Received Power, SL-RSRP, measured on a reference signal, RS, of a physical channel carrying the respective one of the one or more transmissions, a distance determined between the receiving device and the respective one of the one or more transmitting devices, an arrival time at which the respective one of the one or more transmissions is received, and a priority associated with the respective one of the one or more transmissions.

In an embodiment, determining whether to communicate the resource coordination message comprises determining to communicate the resource coordination message in response to the one or more parameters satisfying one of one or more thresholds, respectively and determining not to communicate the resource coordination message in response to the one or more parameters dissatisfying the one or more thresholds, respectively.

In an embodiment, the one or more thresholds are satisfied in response to the SL-RSRP being greater than or equal to a respective one of the one or more thresholds, the distance being within a respective one of the one or more thresholds, and the priority being higher than or equal to a respective one of the one or more thresholds.

In an embodiment, the one or more thresholds are dissatisfied in response to the SL-RSRP being lower than a respective one of the one or more thresholds, the distance being beyond a respective one of the one or more thresholds, and the priority being lower than a respective one of the one or more thresholds.

In an embodiment, determining whether to communicate the resource coordination message comprises determining to communicate or not to communicate the resource coordination message in absence of the one or more thresholds.

In an embodiment, determining whether to communicate the resource coordination message comprises determining to communicate the resource coordination message based on an arrival time at which the respective one of the one or more transmissions is received.

In an embodiment, determining the format for the resource coordination message comprises one of: determining to use a map-based format in response to the one or more parameters being higher than a first threshold, determining to use a flag-based format in response to the one or more parameters being lower than a second threshold, determining to use an indicated format in response to receiving the indicated format in the respective one of the one or more transmissions, and determining to use a preconfigured format in response to the preconfigured format being different from the indicated format.

In an embodiment, a wireless device is provided. The wireless device includes processing circuitry. The processing circuitry is configured to cause the wireless device to receive one or more transmissions from one or more transmitting devices, determine whether to communicate a resource coordination message to a respective one of the one or more transmitting devices based on one or more parameters obtained from a respective one of the one or more transmissions received from the respective one of the one or more transmitting devices, determine a format for the resource coordination message based on the one or more obtained parameters in response to determining to communicate the resource coordination message, and transmit the resource coordination message to the respective one of the one or more transmitting devices in the determined format.

In an embodiment, the processing circuitry is further configured to cause the wireless device to perform the steps in any of the claims performed by the receiving device.

In an embodiment, a method performed by a transmitting device for enabling inter-UE resource coordination is provided. The method includes one or more of transmitting at least one transmission to at least one receiving device, receiving at least one resource coordination message from the at least one receiving device in response to transmitting the at least one transmission, and performing one or more actions based on one or more parameters obtained from the at least one resource coordination message.

In an embodiment, transmitting the at least one transmission to the at least one receiving device comprises one or more of transmitting at least one enquiry message to the at least one receiving device and transmitting at least one SCI to the at least one receiving device.

In an embodiment, the at least one transmission is transmitted to the at least one receiving device in a unicast mode, a groupcast mode, or a broadcast mode.

In an embodiment, receiving the at least one resource coordination message comprises obtaining the one or more parameters from the at least one resource coordination message. The one or more parameters comprising one or more of: an SL-RSRP measured on an RS of a physical channel carrying the at least one resource coordination message and a distance between the transmitting device and the at least one receiving device.

In an embodiment, performing the one or more actions comprises one or more of prioritizing the at least one resource coordination message in response to the one or more parameters satisfying one or more thresholds, respectively and discarding the at least one resource coordination message in response to the one or more parameters dissatisfying the one or more thresholds, respectively.

In an embodiment, the one or more thresholds are satisfied in response to the SL-RSRP being greater than or equal to a respective one of the one or more thresholds and the distance being within a respective one of the one or more thresholds.

In an embodiment, the one or more thresholds are dissatisfied in response to the SL-RSRP being lower than a respective one of the one or more thresholds, the distance being beyond a respective one of the one or more thresholds, an arrival time at which the at least one resource coordination message is received, and a priority associated with the at least one resource coordination message.

In an embodiment, performing the one or more actions comprises one or more of reusing a resource selection indicated in the at least one resource coordination message for periodic packet transmission and reusing the one or more parameters obtained from the at least one resource coordination message for a same or different set of receiving devices.

In an embodiment, a wireless device is provided. The wireless device includes processing circuitry. The processing circuitry is configured to cause the wireless device to transmit at least one transmission to at least one receiving device, receive at least one resource coordination message from the at least one receiving device in response to transmitting the at least one transmission and perform one or more actions in response to receiving the at least one resource coordination message.

In an embodiment, the processing circuitry is further configured to cause the wireless device to perform the steps in any of the claims performed by the transmitting device.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 4 is a flowchart of an exemplary method performed by a transmitting device for enabling inter-UE resource coordination in accordance with embodiments of the present disclosure;

DETAILED DESCRIPTION

Figure 1:
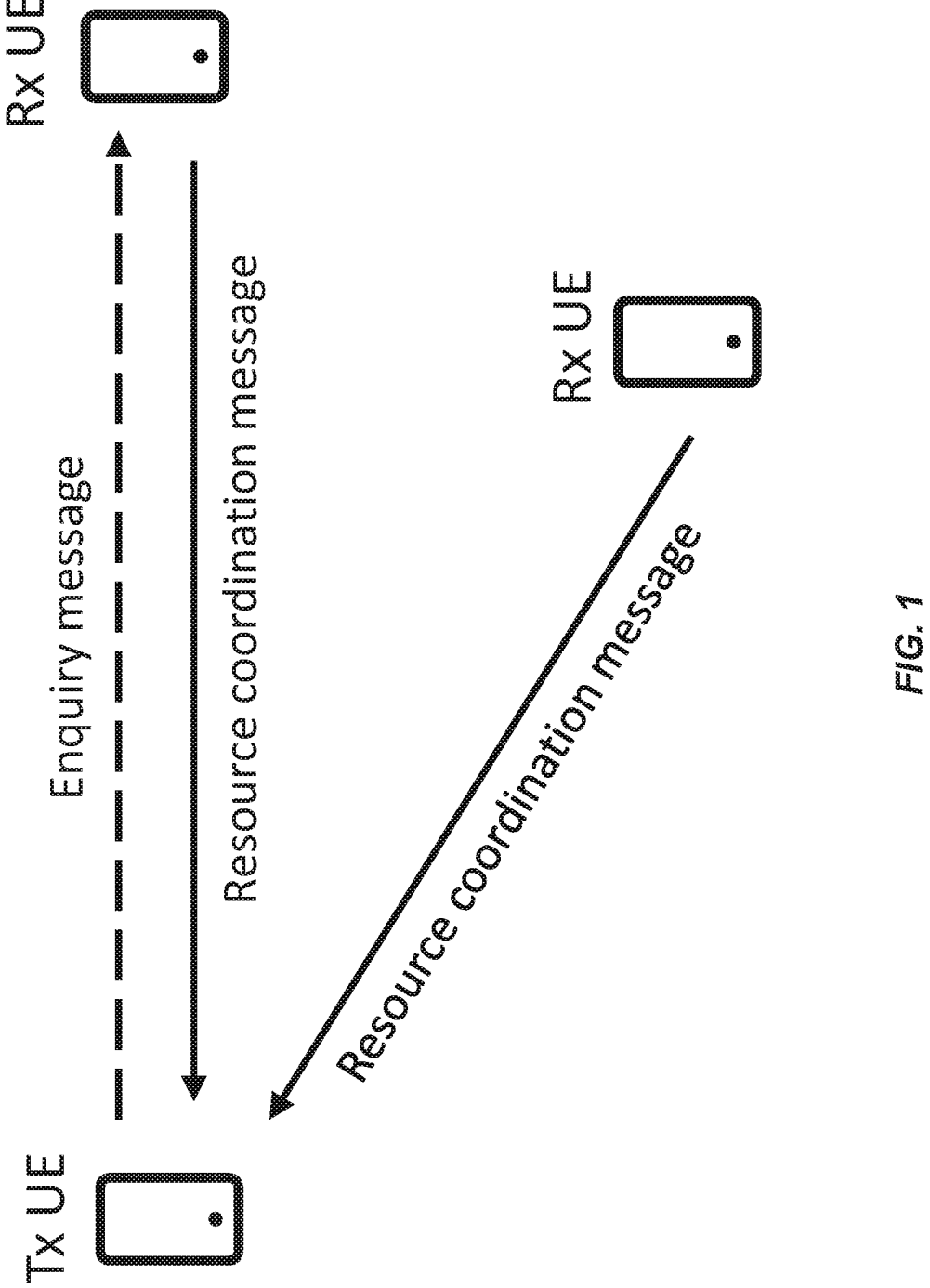
FIG. 1 is a schematic diagram illustrating a transmitting User Equipment (UE) that receives a resource coordination message that can boost/improve resource selection at the transmitting UE with or without sending an enquiry message.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). Most of the details of the inter-UE coordination mechanism are still open at the moment. A few fundamental questions to be answered include:

which UEs should send the coordination message, and/or which format of the message should be used (e.g., the map-based or the flag-based formats described in FIG. 1).

These questions are relevant to all casting types (unicast/groupcast/broadcast) but are most relevant to groupcast and broadcast use case wherein a Transmitting (TX) UE has an incentive to obtain resource coordination messages from multiple intended receivers.

A seemingly straightforward answer to the first question would be allowing all UEs that receive a coordination message request/enquiry to send coordination messages. That would provide the TX UE with side information to help the TX UE's own resource selection decision. However, doing so may congest the network with coordination messages due to a potentially large size of these coordination messages.

Similarly, for the second question, if all UEs send map-based coordination messages, the TX UE receives a lot of side information, which may cause the network to be congested. On the other hand, if only flag-based coordination messages are used, the TX UE may have too little side information to make a good decision.

Another problem is that it may happen that a TX UE receives multiple coordination messages that indicate contradicting favorable resources. In this case, it is important to have a rule (or set of rules) at the TX UE to make use of the most relevant coordination messages.

In summary, the resource coordination mechanism should obtain a good trade-off between the amount of side information obtained via coordination messages (i.e., the benefits of coordination messages) and the signaling overhead created by these messages.

Certain aspects of the present disclosure may provide solutions to the aforementioned or other challenges. According to embodiments disclosed herein, rules/criteria to define the format/type of a resource coordination message transmitted from the Receiving (RX) UE(s) are defined. Moreover, based on different thresholds and conditions, which are (pre-)configured, the resource coordination message may not be transmitted by the RX UE (i.e., restricting the number of UEs sending the coordination messages or discarding the resource coordination message during the reception process at the TX UE).

Additionally, a set of rules/criteria to combine the different formats/types of resource coordination messages, which are received in a pre-determined time period, are defined at the TX UE in order to obtain a more reliable resource information.

In essence, the embodiments disclosed herein rely on exploiting information about physical distance and/or radio distance (e.g., Sidelink (SL)-Reference Signal Received Power (SL-RSRP)) to obtain a good trade-off between potential benefits of coordination messages and signaling overhead created by these coordination messages. There are solutions to be applied at the TX UE and solutions to be applied at the RX UE.

There are, proposed herein, various embodiments which address one or more of the issues disclosed herein. In one aspect a method performed by a receiving device for performing inter-UE resource coordination with a transmitting device is provided. The method includes determining whether to send a resource coordination message to the transmitting device. The method also includes transmitting the resource coordination message to the transmitting device in response to determining to send the resource coordination message.

In another aspect, a method performed by a transmitting device for performing inter-UE resource coordination with one or more receiving devices is provided. The method includes transmitting an enquiry message and/or an SCI to the one or more receiving devices in unicast, groupcast, or broadcast mode. The method also includes filtering and/or combining one or more resource coordination messages received from the one or more receiving devices.

Certain embodiments may provide one or more of the following technical advantage(s). The embodiments disclosed herein can help achieve a sound tradeoff between benefits of coordination messages and overhead created by these messages. Specifically, Decrease (potential) network load due to a more efficient way of selecting the resource coordination message format by the RX UE(s).

Decrease a number of ineffective resource coordination messages, i.e., resource coordination messages that do not add any side information to the TX UE resource selection. This reduction in the number of messages can lead to a power consumption reduction both at the TX UE and at the RX UE.

Obtain better suggestions at the TX UE by having a set of rules to define what format the resource coordination message should have, or which RX UE(s) should send the resource coordination message.

Create a framework at the TX UE to combine different types of resource coordination formats in order to obtain a more optimal suggestion.

Figure 2:
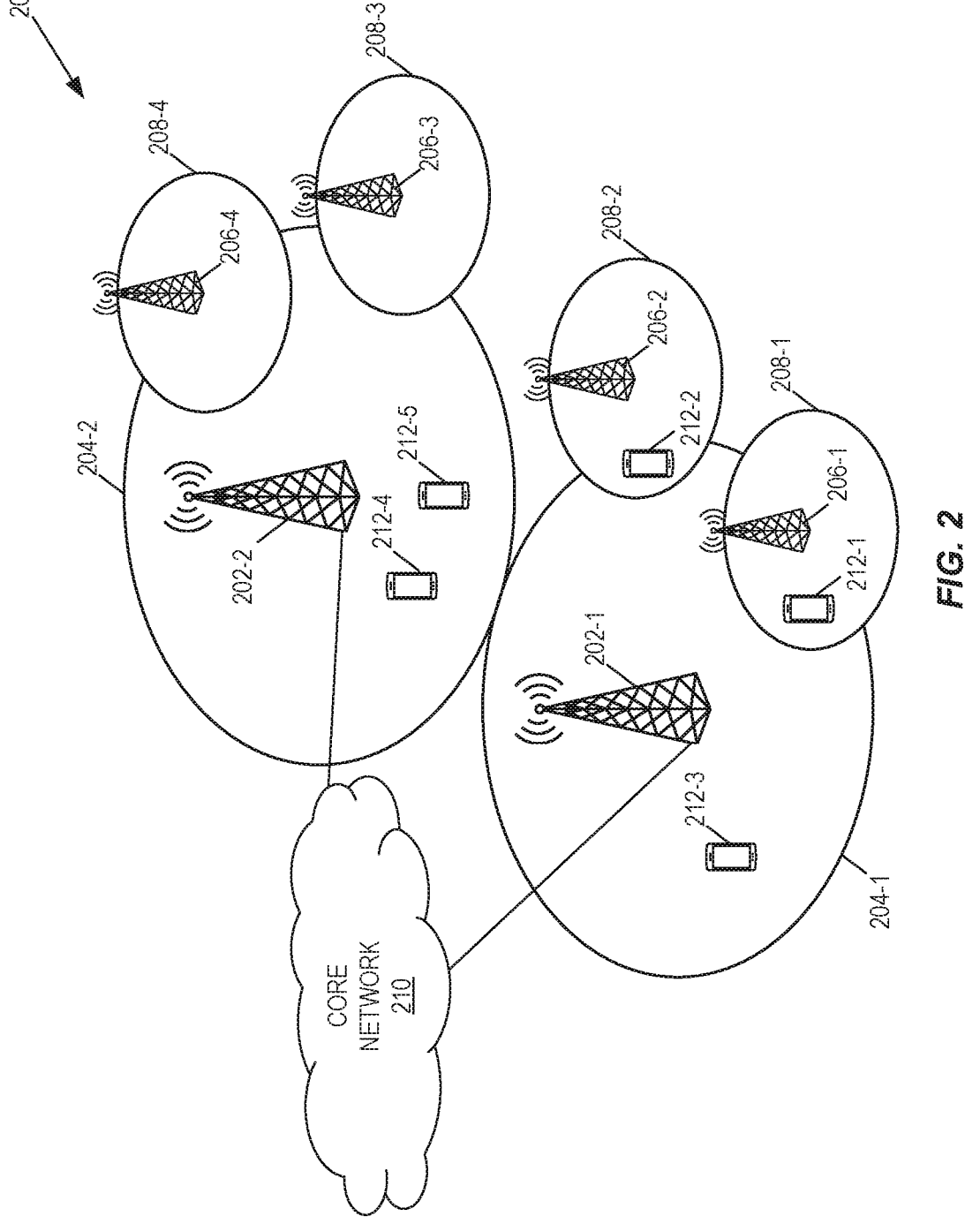
FIG. 2 illustrates one example of a cellular communications system in which embodiments of the present disclosure may be implemented.

FIG. 2 illustrates one example of a cellular communications system 200 in which embodiments of the present disclosure may be implemented. In the embodiments described herein, the cellular communications system 200 is a 5G system (5GS) including a Next Generation RAN (NG-RAN) and a 5G Core (5GC). In this example, the RAN includes base stations 202-1 and 202-2, which in the 5GS include NR base stations (gNBs) and optionally next generation eNBs (ng-eNBs) (e.g., LTE RAN nodes connected to the 5GC), controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5G System (5GS) is referred to as the 5GC. The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs, but the present disclosure is not limited thereto.

This disclosure describes methods for the inter-UE coordination mechanism between UEs using NR SL communication. These methods define RX UE(s) eligible/allowed to send a resource coordination message and format/type of the resource coordination message based on network conditions, geographical conditions, or radio parameters.

Even though the focus of the present disclosure is in 3GPP technology (NR SL) and terminology, most of the embodiments are, in general, applicable to any kind of direct communications between UEs involving Device-to-Device (D2D) communications, such as LTE SL or other Institute of Electrical and Electronics Engineers (IEEE) based technologies.

Herein, a TX UE denotes a UE that is going to send a data packet to another UE, namely the RX UE. The RX UE sends a coordination message to the Tx UE (with or without an enquiry from the TX UE) to help the TX UE in selecting resources for the data transmission.

Figure 3:
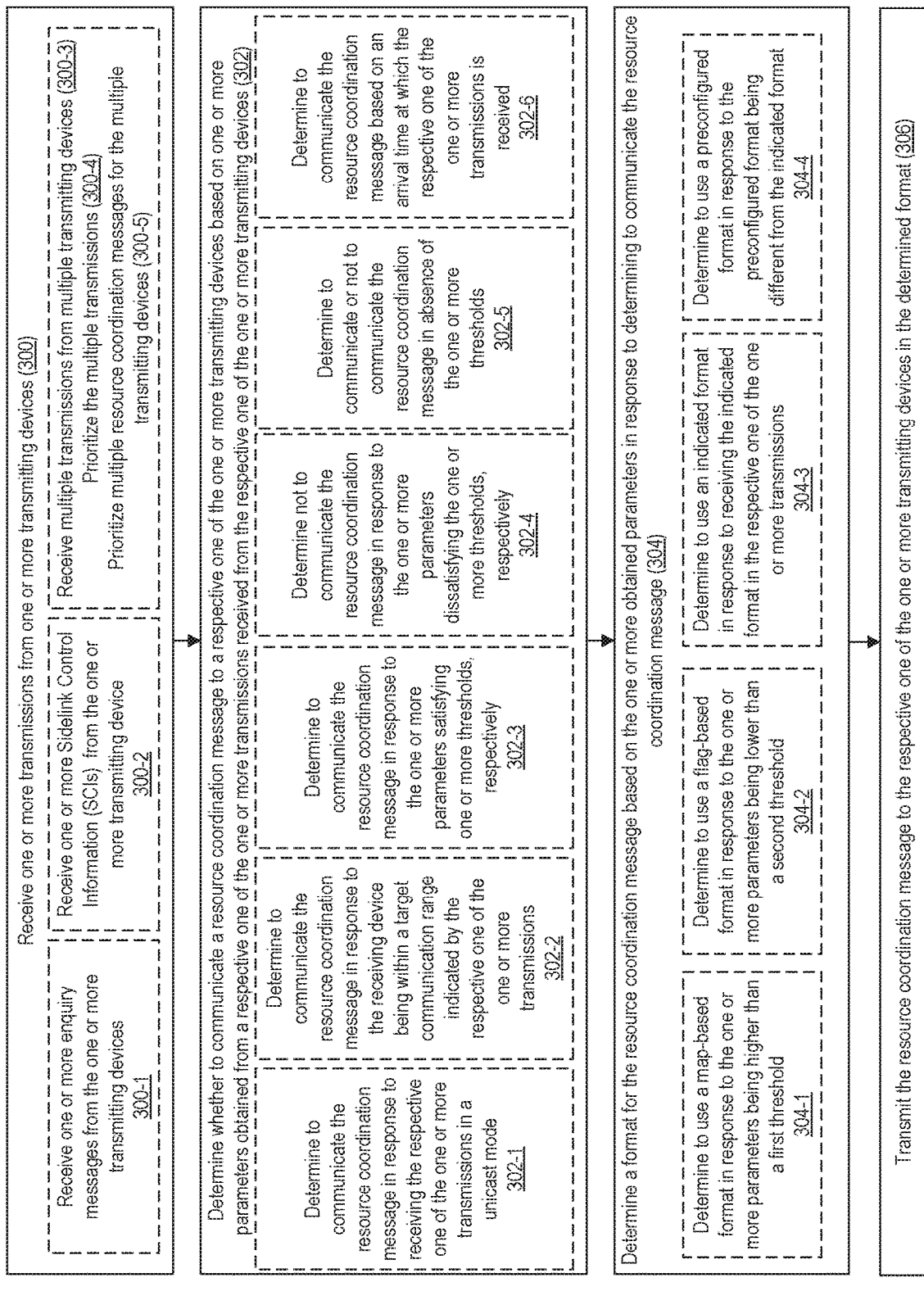
FIG. 3 is a flowchart of an exemplary method performed by a receiving device for enabling inter-UE resource coordination in accordance with embodiments of the present disclosure.

Before discussing specific embodiments of the present disclosure, an overview of the methods performed by a receiving device (e.g., RX UE) and a transmitting device (e.g., TX UE) are first provided with reference to FIGS. 3 and 4, respectively.

FIG. 3 is a flowchart of an exemplary method performed by a receiving device for enabling inter-UE resource coordination in accordance with embodiments of the present disclosure. The receiving device is configured to receive one or more transmissions from one or more transmitting devices (step 300). In an embodiment, the receiving device can receive one or more enquiry messages from the one or more transmitting devices (step 300-1). In an embodiment, the receiving device can receive one or more Sidelink Control Information (SCIs) from the one or more transmitting devices (step 300-2). In an embodiment, the one or more transmissions can include multiple transmissions and the receiving device can receive the multiple transmissions from multiple transmitting devices (step 300-3). Accordingly, the receiving device can prioritize the multiple transmissions (step 300-4) and/or prioritize multiple resource coordination messages for the multiple transmitting devices (step 300-5).

The receiving device is configured to determine whether to communicate a resource coordination message to a respective one of the one or more transmitting devices based on one or more parameters obtained from a respective one of the one or more transmissions received from the respective one of the one or more transmitting devices (step 302). In an embodiment, the receiving device can determine to communicate the resource coordination message in response to receiving the respective one of the one or more transmissions in a unicast mode (step 302-1). In an embodiment, the receiving device can determine to communicate the resource coordination message in response to the receiving device being within a target communication range indicated by the respective one of the one or more transmissions (step 302-2). In an embodiment, the receiving device can determine to communicate the resource coordination message in response to the one or more parameters satisfying one or more thresholds, respectively (step 302-3). In an embodiment, the receiving device can determine not to communicate the resource coordination message in response to the one or more parameters dissatisfying the one or more thresholds, respectively (step 302-4). In an embodiment, the receiving device can determine to communicate or not to communicate the resource coordination message in absence of the one or more thresholds (step 302-5). In an embodiment, the receiving device can determine to communicate the resource coordination message based on an arrival time at which the respective one of the one or more transmissions is received (step 302-6).

The receiving device is configured to determine a format for the resource coordination message based on the one or more obtained parameters in response to determining to communicate the resource coordination message (step 304). In an embodiment, the receiving device can determine to use a map-based format in response to the one or more parameters being higher than a first threshold (step 304-1). In an embodiment, the receiving device can determine to use a flag-based format in response to the one or more parameters being lower than a second threshold (step 304-2). In an embodiment, the receiving device can determine to use an indicated format in response to receiving the indicated format in the respective one of the one or more transmissions (step 304-3). In an embodiment, the receiving device can determine to use a preconfigured format in response to the preconfigured format being different from the indicated format (step 304-4).

The receiving device can then transmit the resource coordination message to the respective one of the one or more transmitting devices in the determined format (step 306).

FIG. 4 is a flowchart of an exemplary method performed by a transmitting device for enabling inter-UE resource coordination in accordance with embodiments of the present disclosure. The transmitting device is configured to transmit at least one transmission to at least one receiving device (step 400). In an embodiment, the transmitting device can transmit at least one enquiry message to the at least one receiving device (step 400-1). In an embodiment, the transmitting device can transmit at least one SCI to the at least one receiving device (step 400-2).

The transmitting device is configured to receive at least one resource coordination message from the at least one receiving device in response to transmitting the at least one transmission (step 402). In an embodiment, the transmitting device can obtain one or more parameters from the at least one resource coordination message (step 402-1).

The transmitting device can then perform one or more actions based on the one or more parameters obtained from the at least one resource coordination message (step 404). In an embodiment, the transmitting device can prioritize the at least one resource coordination message in response to the one or more parameters satisfying one or more thresholds, respectively (step 404-1). In an embodiment, the transmitting device can discard the at least one resource coordination message in response to the one or more parameters dissatisfying the one or more thresholds, respectively (step 404-2). In an embodiment, the transmitting device can reuse a resource selection indicated in the at least one resource coordination message for periodic packet transmission (step 404-3). In an embodiment, the transmitting device can reuse the one or more parameters obtained from the at least one resource coordination message for a same of different set of receiving devices (step 404-4).

Figure 5:
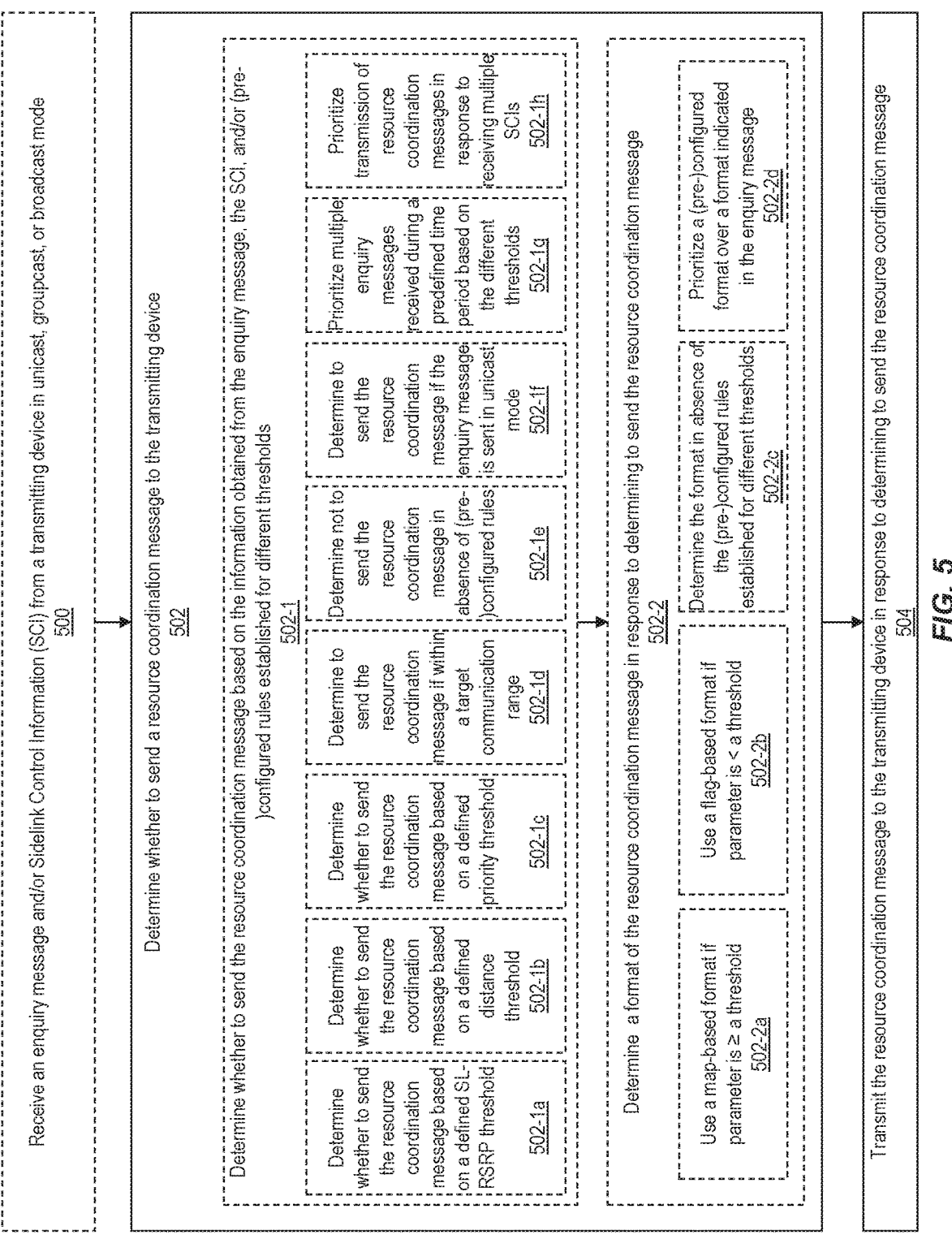
FIG. 5 is a flowchart of an exemplary method performed by a receiving device for performing inter-UE resource coordination with a transmitting device according to embodiments of the present disclosure.

FIG. 5 is a flowchart of an exemplary method performed by a receiving device for performing inter-UE resource coordination with a transmitting device according to embodiments of the present disclosure. The receiving device may receive an enquiry message and/or SCI from a transmitting device in unicast, groupcast, or broadcast mode (step 500). The receiving device determines whether to send a resource coordination to the transmitting device (step 502). The receiving device may determine whether to send the resource coordination message based on information obtained from the enquiry message (e.g., target communication range, location of the transmitting device, etc.), the SCI (e.g., target communication range, location of the transmission device, etc.), and/or (pre-)configured rules established for different thresholds (e.g., SL-RSRP threshold, distance threshold, priority threshold, etc.) (step 502-1).

The receiving device may determine whether to send the resource coordination message when the SL-RSRP is higher than or equal to a defined SL-RSRP threshold or not to send to resource coordination message when the SL-RSRP is below the defined SL-RSRP threshold (step 502-1a). The receiving device may measure SL-RSRP on a reference signal (e.g., DMRS) of a physical channel carrying the enquiry message or the SCI. The receiving device may determine whether to send the resource coordination message when the distance to the transmitting device is higher than or equal to a defined distance threshold or not to send to resource coordination message when the distance to the transmitting device is below the defined distance threshold (step 502-1b). The receiving device may determine whether to send the resource coordination message when the priority is higher than or equal to a defined priority threshold or not to send to resource coordination message when the priority is below the defined priority threshold (step 502-1c). The receiving device may determine to send the resource coordination message when the enquiry message includes a target communication range and the receiving device is within the target communication range (step 502-1d). The receiving device may determine not to send the resource coordination message in absence of (pre-)configured rules and/or the different thresholds (step 502-1e). The receiving device may determine to send the resource coordination message (e.g., based on network/UE conditions) in absence of the (pre-) configured rules and/or the different thresholds when the enquiry message is sent in unicast mode (step 502-1f). The receiving device may prioritize multiple enquiry messages received during a predefined time period based on the different thresholds (e.g., priority, SL-RSRP, or distance to the transmitting device) associated with the (pre-) configured rules (step 502-1g). The receiving device may prioritize transmission of resource coordination messages in response to receiving multiple SCIs (step 502-1h).

The receiving device may determine a format of the resource coordination message in response to determining to send the resource coordination message (step 502-2). The receiving device may use a map-based format if a parameter(s) (e.g., SL-RSRP, distance, priority, etc.) is higher than or equal to a threshold (e.g., Th-a) (step 502-2a). The receiving device may use a flag-based format if a parameter(s) (e.g., SL-RSRP, distance, priority, etc.) is less than a threshold (e.g., Th-b) (step 502-2b). The receiving device may determine the format (e.g., use a defined format, a pre-configured format, or a format indicated in the enquiry message) in absence of the (pre-) configured rules established for different thresholds (e.g., no established threshold in order to determine the format) (step 502-2c). The receiving device may select a (pre-) configured format over a format indicated in the enquiry message when the (pre-) configured format is in conflict with the format indicated in the enquiry message (step 502-2d). The receiving device transmits the resource coordination message to the transmitting device in response to determining to send the resource coordination message (step 504).

Figure 6:
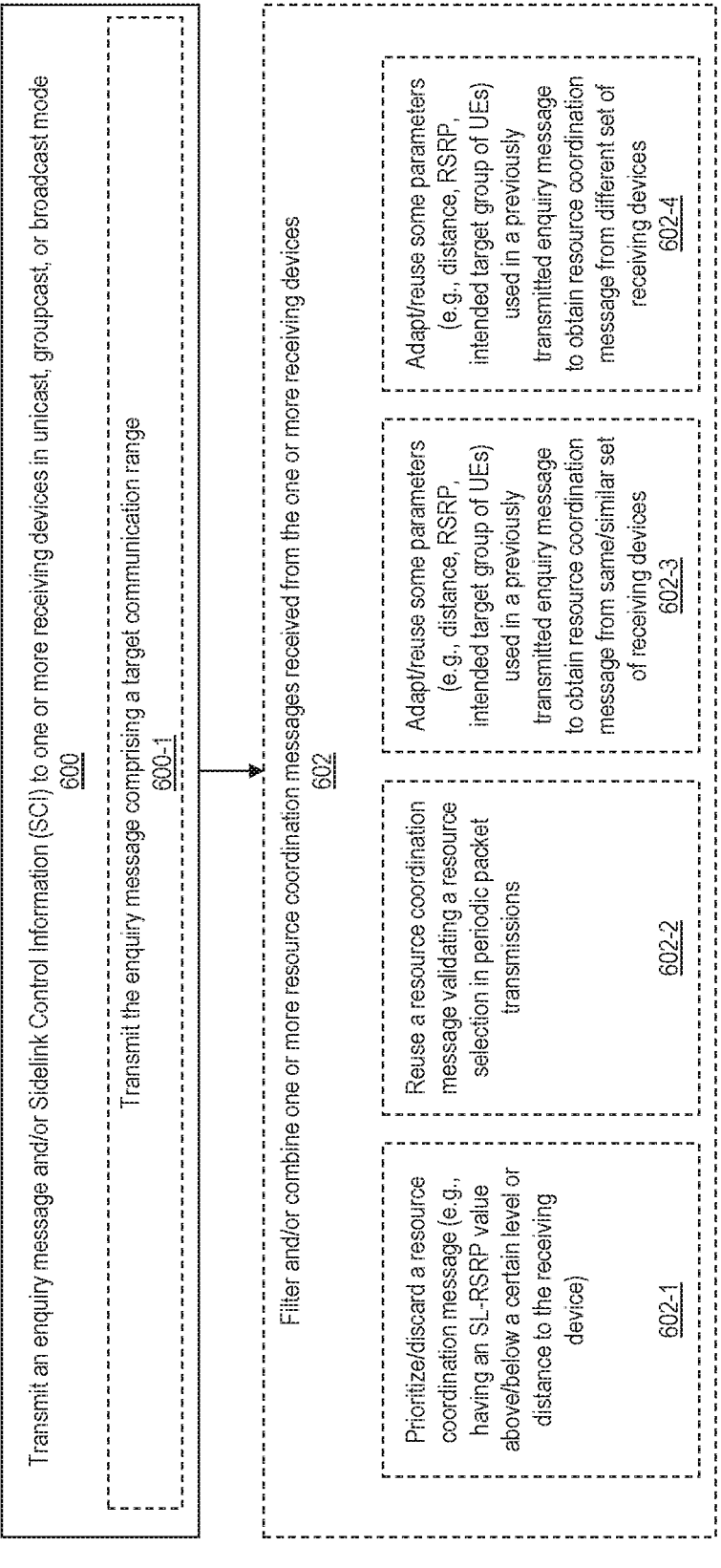
FIG. 6 is a flowchart of an exemplary method performed by a transmitting device for performing inter-UE resource coordination with one or more receiving devices according to embodiments of the present disclosure.

FIG. 6 is a flowchart of an exemplary method performed by a transmitting device for performing inter-UE resource coordination with one or more receiving devices according to embodiments of the present disclosure. The transmitting device transmits an enquiry message and/or an SCI to the receiving devices in unicast, groupcast, or broadcast mode (step 600). The transmitting device may transmit the enquiry message comprising a target communication range (step 600-1). The transmitting device may filter and/or combine one or more resource coordination messages received from the receiving devices (step 602). The transmitting device may prioritize/discard a resource coordination message (e.g., having an SL-RSRP value above/below a defined SL-RSRP threshold or distance to the receiving device above/below a defined distance threshold) (step 602-1). The transmitting device may reuse a resource coordination message validating a resource selection in periodic packet transmissions (step 602-2). The transmitting device may adapt/reuse some parameters (e.g., distance, RSRP, intended target of UEs) used in a previously transmitted enquiry message to obtain a resource coordination message from a same/similar set of receiving devices (step 602-3). The transmitting device may adapt/reuse some parameters (e.g., distance, RSRP, intended target of UEs) used in a previously transmitted enquiry message to obtain a resource coordination message from a different set of receiving devices (step 602-4).

Embodiments disclosed herein provide solutions to the aforementioned problems related to an existing inter-UE coordination mechanism. A solution can address more than one problem and the solutions can be combined in various meaningful ways following any combination of the following described steps. The solutions can be used in unicast connections, groupcast connections, and broadcast connections, although not all steps may be used for each of them. A general description of the methods for the Inter-UE coordination framework are defined as follows:

Step 1 (e.g., step 300, 400): Triggering of the coordination message: this step can be performed from the TX UE by sending an enquiry message directed to the RX UE(s) in unicast, groupcast, or broadcast mode (e.g., steps 300-1, 400-1). Alternatively, this step may be started at the RX UE by receiving an SCI from the TX UE (e.g., steps 300-2, 400-2).

Step 2 (e.g., step 302): Obtain information from the SCI or the enquiry message: the RX UE gathers information with respect to the type of coordination message and other related parameters:

From the enquiry message: in the enquiry message the desired format from the TX UE perspective is included and the RX UE may or may not follow the wanted format from the TX UE.

Based on SCI reception by the RX UE: the RX UE(s) receive(s) the SCI from the TX UE and upon perceiving a future collision from the SCI reserved resources, a coordination message is triggered at the RX UE.

Step 3 (e.g., step 304): Rules at the RX UE for formatting and determining whether to send the resource coordination message: based on the parameters of the received enquiry message or the received SCI, e.g., RSRP values or the location information, the RX UE follows the (pre-)configured rules established for the different thresholds to decide the format of the coordination message or whether to transmit the resource coordination message:

Step 3a (e.g., step 302): Transmission (or not) of the resource coordination message: the RX UE determines whether to transmit the resource coordination message based on certain parameters from the enquiry message or from the received SCI—in the case of a non-enquiry based mechanism—such as the RSRP value or the distance between the TX UE or the RX UE.

Step 3b (e.g., step 304): Selection of the resource coordination format at the RX UE: upon receiving the enquiry message or the SCI, the RX UE selects the format of the coordination message based on the (pre-) configured rules.

Step 4 (e.g., step 404): Rules at the TX UE for filtering and/or combining the received resource coordination message(s): upon receiving the coordination message, the TX UE may discard certain coordination messages coming from specific RX UE(s) and/or combine different formats of the coordination message to obtain a more reliable resource suggestion.

Specific embodiments of Steps 3, 3a, 3b, and 4 are discussed in detail below.

Embodiments Related to Step 3 (e.g., Step 302)

In the main embodiment, the RX UE(s) decodes the information included in the enquiry message or the received SCI transmitted by the TX UE based on (pre-) configured conditions, e.g., SL-RSRP level or distance between the TX UE and the RX UE. The RX UE(s) also determines whether to transmit the resource coordination message and/or selects the format of the resource coordination message in response to determining to transmit the resource coordination message.

Embodiments Related to Step 3a (e.g., Step 302)

In one embodiment, the TX UE sends the enquiry message to a set of RX UEs (e.g., step 400-1) and the RX UE in a set decides whether or not to send a coordination message based on at least one of: SL-RSRP, distance between the TX UE and the RX UE, other parameters from the suggestion (e.g., time of arrival, priority of the resource selection, etc.) (e.g., steps 302-3, 302-4):

In a sub-embodiment, the SL-RSRP is measured on a reference signal (e.g., DMRS) of the physical channel carrying the enquiry message.

In another sub-embodiment, the SL-RSRP is measured on the DMRS of an SCI (i.e., PSCCH DMRS) sent by the TX UE.

In one embodiment (e.g., step 302-2), if the TX UE sends the enquiry message including a target communication range, only those RX UEs within the communication range send the resource coordination message.

In another embodiment (e.g., step 302-5), if there are no (pre-)configured rules or thresholds to send the resource coordination message, the RX UE(s) do not send the resource coordination message in groupcast or broadcast.

In another embodiment (e.g., step 302-5), if there are no (pre-)configured conditions or thresholds (i.e., there are no established thresholds in order to decide whether to transmit the resource coordination message and the enquiry has been transmitted in unicast mode), it is up to UE implementation to send the resource coordination message and/or can be based on network or individual UE conditions, e.g., UE's available energy.

In a related embodiment, the RX UE uses the following thresholds which are (pre-)configured in order to decide whether to transmit the resource coordination message as follows:

If the parameter (i.e., SL-RSRP, distance, priority, etc.) is higher than or equal to a certain threshold Th1: the RX UE(s) transmits the resource coordination message (e.g., step 302-3).

If the parameter (i.e., SL-RSRP, distance, priority, etc.) is lower than a certain threshold Th1: the RX UE does not transmit the resource coordination message (e.g., step 302-4).

Note: the thresholds can also be defined in reverse order, i.e., the RX UE(s) do not transmit when the parameter (i.e., SL-RSRP, distance, priority, etc.) is higher than or equal to a certain threshold Th1, and the RX UE(s) transmits when the parameter (i.e., SL-RSRP, distance, priority, etc.) is lower than a certain threshold Th1.

In another embodiment (e.g., steps 300-3, 300-4), if a RX UE receives several enquiry messages during a pre-defined time period, e.g., several enquiries in a period T seconds from different TX UEs, the RX UE prioritizes the enquiry messages based on priority of the transmissions, i.e., the priority included in the enquiry; or based on the SL-RSRP; or on the distance between the TX UE and the RX UE.

In a related embodiment (e.g., steps 300-3, 300-4), if a RX UE senses SCI from different TX UEs— during a certain time period—where a potential collision may occur, the RX UE prioritizes the transmission of the resource coordination message to a certain Tx UE(s) based on the priority of the transmission (included in the SCI); or based on the RSRP; or on the distance, or a combination thereof.

Embodiments Related to Step 3b (e.g., Step 304)

In one embodiment, if the RX UE(s) transmits the resource coordination message, i.e., the conditions and thresholds defined in Step 3a are fulfilled, the format of the resource coordination message is determined based on the following (pre-) configured conditions, which can be based on SL-RSRP, distance between the TX UE and the RX UE, or other parameters from the suggestion (e.g., time of arrival, priority of the selection):

If the parameter (e.g., step 304-1) (i.e., SL-RSRP, distance, priority, etc.) is higher than or equal to a certain threshold Th2_*a*: the RX UE uses a map-based format for the coordination message indicating free/idle resources to be selected by the TX UE.

If the parameter (e.g., step 304-2) (i.e., SL-RSRP, distance, priority, etc.) is lower than a certain threshold Th2_*b*: the RX UE uses a flag-based format for the coordination message to indicate whether the TX UE should re-select its previously selected resources.

In a related embodiment, the thresholds Th2_*a* and Th2_*b* can be the same or different.

If there is no pre-configuration (i.e., there is no established threshold in order to select the type of format), it is up to UE implementation to use a defined format, or be (pre-)configured, or follow a format indicated in the enquiry message in an enquiry-based procedure. In some other cases, the UE selects a format randomly.

In a related embodiment (e.g., step 304-3), in case the wanted type of format is included in the enquiry message from the TX UE and the (pre-)configured format (i.e., the one defined based on previous conditions) is conflicting with the format indicated in the enquiry message, the (pre-) configured format prevails (e.g., 304-4).

Embodiments Related to Step 4 (e.g., Step 404)

In one embodiment (e.g., steps 404-1, 404-2), the TX UE prioritizes—or discards—the suggestions which have an associated SL-RSRP value above or below a certain level or based on the distance between the TX UE and the RX UE:

If the parameter (i.e., SL-RSRP, distance, priority, etc.) is above or equal to a certain threshold Th3, the resource coordination messages that fulfill this condition are prioritized while the rest are discarded.

If the parameter (i.e., SL-RSRP, distance, priority, etc.) is below a certain threshold Th3, the resource coordination messages that fulfill this condition are prioritized while the rest are discarded.

If there is no (pre-)configured value, the prioritization or discard of the resource coordination messages is left up to UE implementation.

In another embodiment (e.g., step 404-3), for the case of periodic transmissions of packets, a TX UE upon receiving a coordination message from a RX UE(s) validating the resource selection, i.e., one-bit format (ACK), the TX UE reuses the resource coordination message from the RX UE(s) for the next transmission to the same target UE.

In another embodiment, upon a successful transmission by the TX UE according to a particular resource coordination message from a RX UE(s), i.e., the TX UE has received useful information in the resource coordination message, some of the parameters used for the resource enquiry (e.g., distance, RSRP, or intended target group of UEs for the enquiry) are adapted/re-used to obtain the resource coordination message from the same/similar set of UEs for the next transmission(s) or a different set of UEs for the next transmission(s) (e.g., step 404-4).

Figure 7:
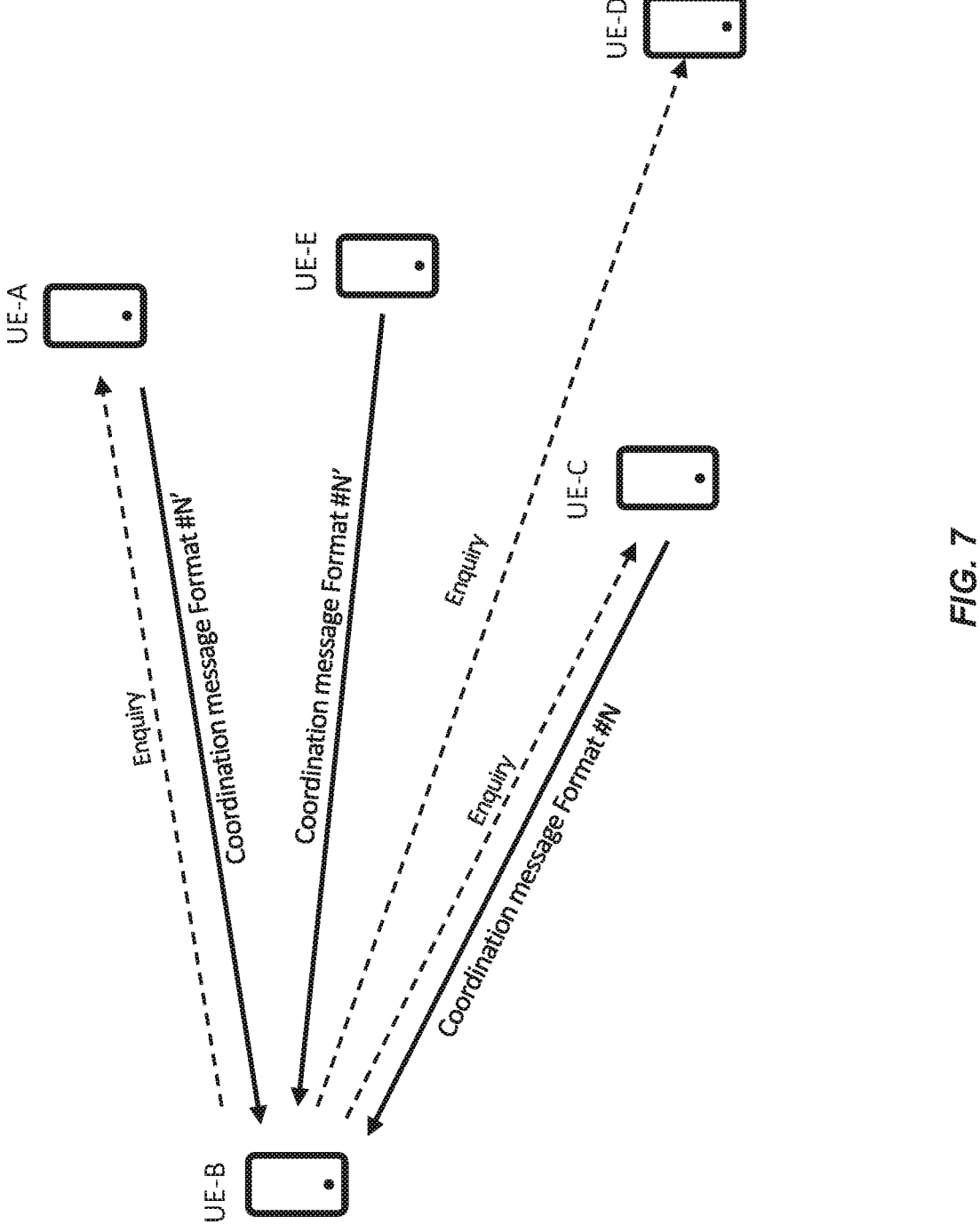
FIG. 7 illustrates a scenario of Sidelink (SL)-Received Reference Signal Power (RSRP) based inter-UE coordination.
Figure 8:
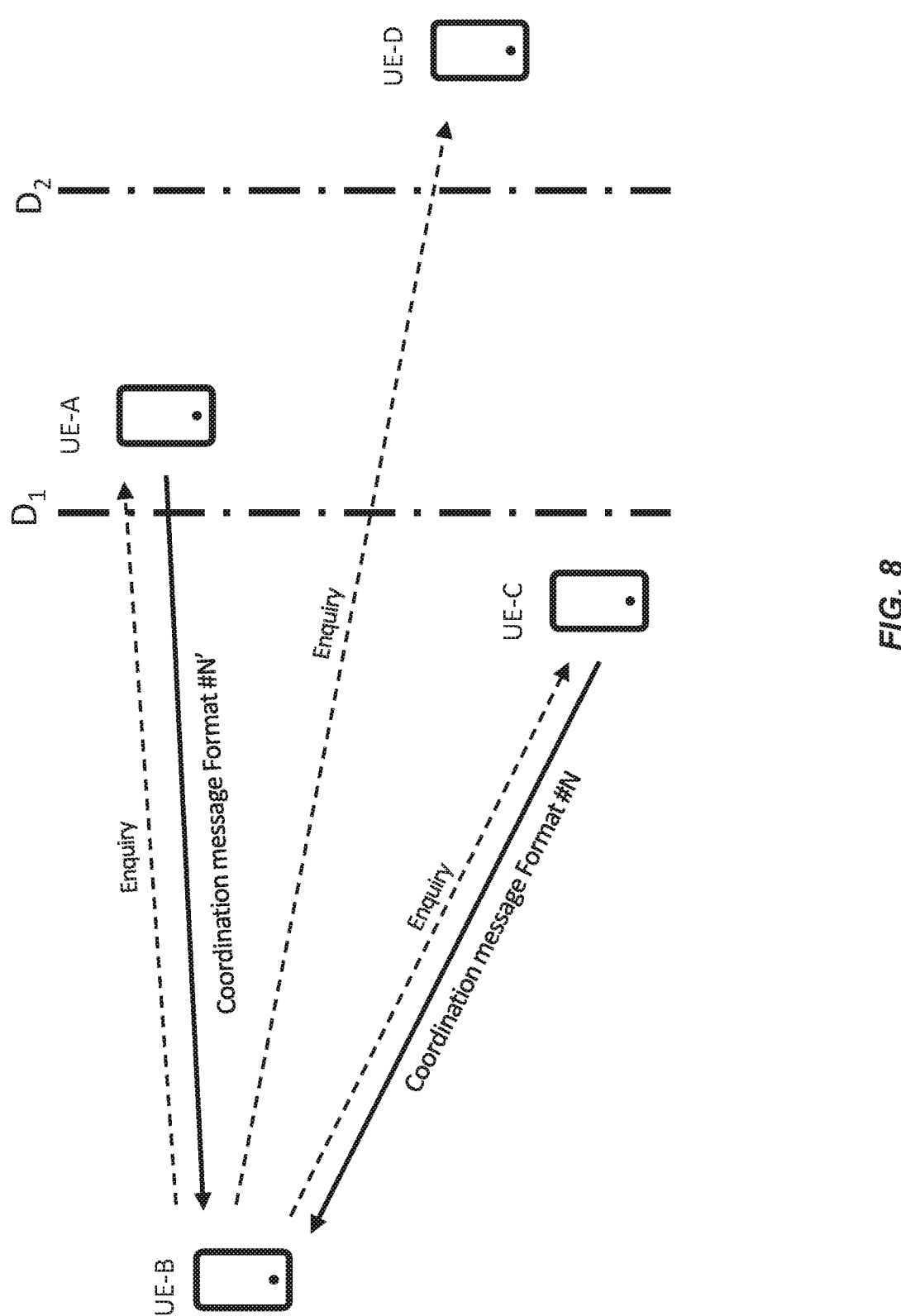
FIG. 8 illustrates a scenario of distance based inter-UE coordination.

FIGS. 7 and 8 illustrate two different scenarios that are defined and used as examples of the proposed methods.

FIG. 7 illustrates a scenario of SL-RSRP based inter-UE coordination. In this scenario, UE-B acts as the TX UE (as defined in previous embodiment in the invention) and UE-A, UE-C, UE-D and UE-E act as the RX UEs (as defined in previous embodiment in the invention).

The TX UE sends the enquiry message to a sub-set of the RX UEs (UE-A, UE-C and UE-D) including the desired format of the resource coordination message. At the same time, UE-E senses the SCI from UE-B and anticipates a potential collision in the resources selected by UE-B.

Upon receiving the enquiry message, UE-C, UE-D and UE-A, obtain the parameters from the enquiry and based on the (pre-)configured conditions and threshold they act accordingly:

Related to Step 3a (whether to transmit or not the coordination message): UE-A obtains the SL-RSRP from the enquiry message and its value is above a certain threshold Th1, and therefore, UE-A transmits the coordination message.

Related to Step 3b (format of the coordination message): based on the value of SL-RSRP it the format of the coordination message is N, i.e., the SL-RSRP is below a certain threshold Th2.

Related to Step 3a (whether to transmit or not the coordination message): UE-C obtains the SL-RSRP from the enquiry message and its value is above a certain threshold Th1, and therefore, UE-C transmits the coordination message.

Related to Step 3b (format of the coordination message): Moreover, based on the value of SL-RSRP it the format of the coordination message is N, i.e., the SL-RSRP is above of equal to a certain threshold Th2.

Related to Step 3a (whether to transmit or not the coordination message): UE-D obtains the SL-RSRP from the enquiry message and its value is below a certain threshold Th1, and therefore, UE-D does not transmit the coordination message.

In the case of UE-E, since there is no enquiry, it uses the SL-RSRP from the received SCI in order to decide whether to transmit the resource coordination message (analogous procedure as UE-A).

At the TX UE side upon receiving the different resource coordination message from UE-A, UE-C and UE-D, the prioritization of the resource coordination messages is based on the SL-RSRP conditions which are (pre-) defined.

FIG. 8 illustrates a scenario of distance based inter-UE coordination. In this scenario, UE-B acts as the TX UE (as defined in a previous embodiment in the disclosure) and UE-A, UE-C, UE-D act as the Rx UEs (as defined in previous embodiment in the invention). The steps in this scenario are analogous to the Scenario in FIG. 7, but in this case the conditions and thresholds are based on the distance between the TX UE and the RX UEs.

Figure 9:
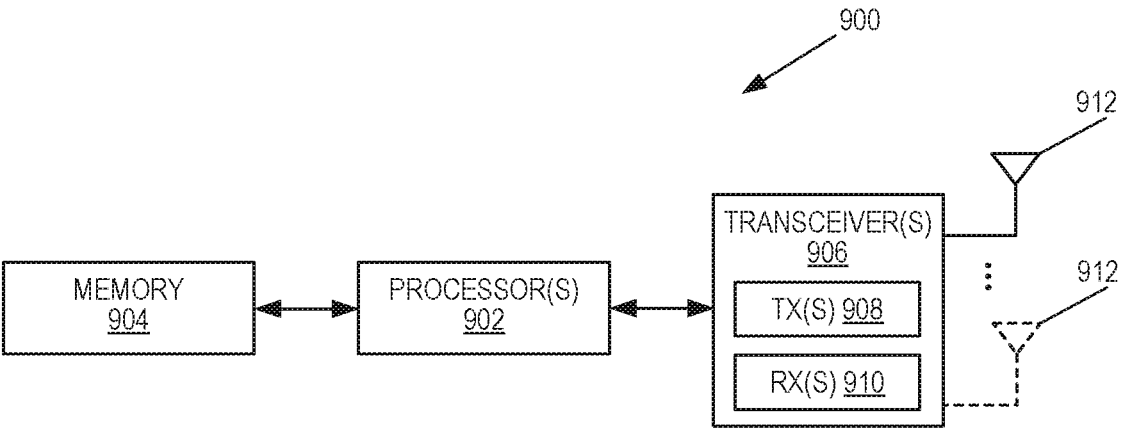
FIG. 9 is a schematic block diagram of a wireless communication device according to some embodiments of the present disclosure.

FIG. 9 is a schematic block diagram of a wireless communication device 900 according to some embodiments of the present disclosure. As illustrated, the wireless communication device 900 includes one or more processors 902 (e.g., CPUs, ASICs, FPGAs, and/or the like), memory 904, and one or more transceivers 906 each including one or more transmitters 908 and one or more receivers 910 coupled to one or more antennas 912. The transceiver(s) 906 includes radio-front end circuitry connected to the antenna(s) 912 that is configured to condition signals communicated between the antenna(s) 912 and the processor(s) 902, as will be appreciated by on of ordinary skill in the art. The processors 902 are also referred to herein as processing circuitry. The transceivers 906 are also referred to herein as radio circuitry. In some embodiments, the functionality of the wireless communication device 900 described above may be fully or partially implemented in software that is, e.g., stored in the memory 904 and executed by the processor(s) 902. Note that the wireless communication device 900 may include additional components not illustrated in FIG. 9 such as, e.g., one or more user interface components (e.g., an input/output interface including a display, buttons, a touch screen, a microphone, a speaker(s), and/or the like and/or any other components for allowing input of information into the wireless communication device 900 and/or allowing output of information from the wireless communication device 900), a power supply (e.g., a battery and associated power circuitry), etc.

In some embodiments, a computer program including instructions which, when executed by at least one processor, causes the at least one processor to carry out the functionality of the wireless communication device 900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
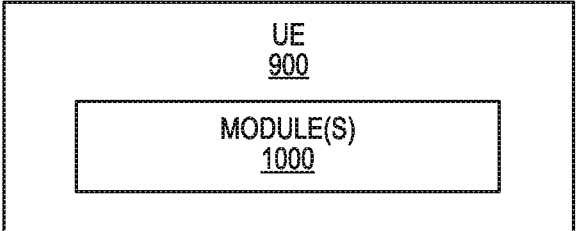
FIG. 10 is a schematic block diagram of the wireless communication device according to some other embodiments of the present disclosure.

FIG. 10 is a schematic block diagram of the wireless communication device 900 according to some other embodiments of the present disclosure. The wireless communication device 900 includes one or more modules 1000, each of which is implemented in software. The module(s) 1000 provide the functionality of the wireless communication device 1000 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some exemplary embodiments of the present disclosure are as follows.

Embodiment 1: A method performed by a receiving device (e.g., UE) for performing inter-UE resource coordination with a transmitting device (e.g., a UE) is provided. The method includes one or more of determining (502) whether to send a resource coordination message to the transmitting device and transmitting (504) the resource coordination message to the transmitting device in response to determining to send the resource coordination message.

Embodiment 2: The method also includes receiving (500) the enquiry message and/or the SCI from the transmitting device in unicast, groupcast, or broadcast mode.

Embodiment 3: Determining (502) whether to send the resource coordination message to the transmitting device includes determining (502-1) whether to send the resource coordination message based on one or more of: information obtained from the enquiry message (e.g., target communication range, location of the transmitting device, etc.) transmitted by the transmitting device; information obtained from an SCI (e.g., target communication range, location of the transmitting device, etc.); and (pre-) configured rules established for different thresholds, wherein the different thresholds comprise one or more of: (a) a defined SL-RSRP threshold, (b) a defined distance threshold, and (c) a defined priority threshold. Determining (502) whether to send the resource coordination message to the transmitting device also includes determining (502-2) a format of the resource coordination message in response to determining to send the resource coordination message.

Embodiment 4: Determining (502-1) whether to send the resource coordination message comprises one or more of:

determining (502-1*a*) whether to send the resource coordination message when SL-RSRP is higher than or equal to the defined SL-RSRP threshold or not to send the resource coordination message when the SL-RSRP is below the defined SL-RSRP threshold, wherein the SL-RSRP is measured on a reference signal (e.g., DMRS) of a physical channel carry the enquiry message or the SCI; determining (502-1*b*) whether to send the resource coordination message when the distance to the transmitting device is greater than or equal to the defined distance threshold or not to send the resource coordination message when the distance to the transmitting device is less than the defined distance threshold; determining (502-1*c*) whether to send the resource coordination message when the priority is higher than or equal to the defined priority threshold or not to send the resource coordination message when the priority is lower than the defined priority threshold; determining (502-1*d*) to send the resource coordination message when the enquiry message includes a target communication range and the receiving device is within the target communication range; determining (502-1*e*) not to send the resource coordination message in absence of the (pre-)configured rules and/or the different thresholds; determining (502-1*f*) to send the resource coordination message (e.g., based on network/UE conditions) in absence of the (pre-)configured rules and/or the different thresholds when the enquiry message is sent in unicast mode; prioritizing (502-1*g*) multiple enquiry messages received during a predefined time period based on the different thresholds (e.g., priority, SL-RSRP, or distance to the transmitting device) associated with the (pre-) configured rules; and prioritizing (502-1*h*) transmission of resource coordination messages in response to receiving multiple SCIs from the transmitting device.

Embodiment 5: Determining (502-2) the format of the resource coordination message comprises one or more of: using (502-2*a*) a map-based format if a parameter (e.g., SL-RSRP, distance, priority, etc.) is higher than or equal to a threshold (e.g., Th-a); using (502-2*b*) a flag-based format if the parameter (e.g., SL-RSRP, distance, priority, etc.) is less than a threshold (e.g., Th-b); determining (502-2*c*) the format (e.g., use a defined format, a pre-configured format, or a format indicated in the enquiry message) in absence of the (pre-)configured rules established for different thresholds (e.g., no established threshold in order to determine the format); and selecting (502-2*d*) a (pre-)configured format over a format indicated in the enquiry message when the (pre-)configured format is in conflict with the format indicated in the enquiry message.

Embodiment 6: A method performed by a transmitting device (e.g., UE) for performing inter-UE resource coordination with one or more receiving devices (e.g., a UE) is provided. The method includes one or more of: transmitting (600) an enquiry message and/or an SCI to the one or more receiving devices in unicast, groupcast, or broadcast mode and filtering (602) and/or combining one or more resource coordination messages received from the one or more receiving devices.

Embodiment 7: Transmitting (600) the enquiry message and/or the SCI comprises transmitting (600-1) the enquiry message comprising a target communication range.

Embodiment 8: Filtering (602) and/or combining the one or more resource coordination messages comprises one or more of: prioritizing/discarding (602-1) a resource coordination message (e.g., having an SL-RSRP value above/below a defined SL-RSRP threshold or a distance to the receiving device above/below a defined distance threshold); reusing (602-2) a resource coordination message validating a resource selection in periodic packet transmissions; adapting/reusing (602-3) some parameters (e.g., distance, RSRP, intended target group of UEs) used in a previously transmitted enquiry message to obtain a resource coordination message from a same/similar set of receiving devices; and adapting/reusing (602-4) some parameters (e.g., distance, RSRP, intended target group of UEs) used in a previously transmitted enquiry message to obtain the resource coordination message from a different set of receiving devices.

Embodiment 9: A wireless device for performing inter-UE resource coordination is provided. The wireless device includes processing circuitry configured to perform any of the steps of any of the embodiments performed by the receiving device or the transmitting device. The wireless device also includes power supply circuitry configured to supply power to the wireless device.

Embodiment 10: A UE for performing inter-UE resource coordination is provided. The UE includes an antenna configured to send and receive wireless signals. The UE also includes radio front-end circuitry connected to the antenna and to processing circuitry and configured to condition signals communicated between the antenna and the processing circuitry. The processing circuitry is configured to perform any of the steps of any of the embodiments performed by the receiving device or the transmitting device. The UE also includes an input interface connected to the processing circuitry and configured to allow input of information into the UE to be processed by the processing circuitry. The UE also includes an output interface connected to the processing circuitry and configured to output information from the UE that has been processed by the processing circuitry. The UE also includes a battery connected to the processing circuitry and configured to supply power to the UE.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
D2D Device-to-Device
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HARQ Hybrid Automatic Repeat Request
HSS Home Subscriber Server
IoT Internet of Things
IP Internet Protocol
LTE Long Term Evolution
MCS Modulation and Coding Scheme
MME Mobility Management Entity
MTC Machine Type Communication
NEF Network Exposure Function NF Network Function
NR New Radio
NRF Network Function Repository Function
NSSF Network Slice Selection Function
OTT Over-the-Top
PC Personal Computer
PCF Policy Control Function
P-GW Packet Data Network Gateway
ProSe Proximity Services
PSBCH Physical Sidelink Broadcast Channel
PSCCH Physical Sidelink Control Channel
PSFCH Physical Sidelink Feedback Channel
PSSCH Physical Sidelink Shared Channel
QoS Quality of Service
RAM Random Access Memory
RAN Radio Access Network
ROM Read Only Memory
RRC Radio Resource Control
RRH Remote Radio Head
RSRP Reference Signal Received Power
RTT Round Trip Time
SCEF Service Capability Exposure Function
SCI Sidelink Control Information
SIB System Information Block
SIM Subscriber Identification Module
SL Sidelink
SMF Session Management Function
UDM Unified Data Management
UE User Equipment
UPF User Plane Function
UC Use Case
V2X Vehicle-to-Everything/Vehicle-to-Anything Those skilled in the art will recognize improvements and modifications to the embodiments of the present disclosure. All such improvements and modifications are considered within the scope of the concepts disclosed herein.

The invention claimed is:

1. A method performed by a receiving device for enabling inter-User Equipment, UE, resource coordination, comprising:

receiving one or more transmissions from one or more transmitting devices, wherein the one or more transmissions comprise multiple transmissions, and receiving the one or more transmissions from the one or more transmitting devices further comprises one or more of:

receiving the multiple transmissions from multiple transmitting devices;

prioritizing the multiple transmissions based on one or more of:

a respective priority indicated in each of the multiple transmissions;

a respective target communication range indicated in each of the multiple transmissions; and a respective Reference Signal Received Power, RSRP, of a physical channel carrying each of the multiple transmissions; and prioritizing multiple resource coordination messages for the multiple transmitting devices to thereby avoid potential collision among the multiple resource coordination messages based on one or more of:

the respective target communication range indicated in each of the multiple transmissions; and the respective RSRP of the physical channel carrying each of the multiple transmissions;

determining whether to communicate a resource coordination message to a respective one of the one or more transmitting devices based on one or more parameters obtained from a respective one of the one or more transmissions received from the respective one of the one or more transmitting devices;

determining a format for the resource coordination message based on the one or more obtained parameters in response to determining to communicate the resource coordination message; and transmitting the resource coordination message to the respective one of the one or more transmitting devices in the determined format.

2. The method of claim 1, wherein receiving the one or more transmissions from the one or more transmitting devices comprises one or more of:

receiving one or more enquiry messages from the one or more transmitting devices; and receiving one or more Sidelink Control Information, SCIs, from the one or more transmitting devices.

3. The method of claim 1, wherein the multiple transmissions are received from the multiple transmitting devices during a pre-defined time period.

4. The method of claim 1, wherein the one or more transmissions are received in a unicast mode, a groupcast mode, or a broadcast mode.

5. The method of claim 1, wherein determining whether to communicate the resource coordination message comprises determining to communicate the resource coordination message in response to receiving the respective one of the one or more transmissions in a unicast mode.

6. The method of claim 1, wherein determining whether to communicate the resource coordination message further comprises determining to communicate the resource coordination message in response to the receiving device being within a target communication range indicated by the respective one of the one or more transmissions.

7. The method of claim 1, wherein the one or more parameters obtained from the respective one of the one or more transmissions comprise one or more of:

a Sidelink-Reference Signal Received Power, SL-RSRP, measured on a reference signal, RS, of a physical channel carrying the respective one of the one or more transmissions;

a distance determined between the receiving device and the respective one of the one or more transmitting devices;

an arrival time at which the respective one of the one or more transmissions is received; and a priority associated with the respective one of the one or more transmissions.

8. The method of claim 1, wherein determining whether to communicate the resource coordination message comprises determining to communicate the resource coordination message based on an arrival time at which the respective one of the one or more transmissions is received.

9. The method of claim 1, wherein determining the format for the resource coordination message comprises one of:

determining to use a map-based format in response to the one or more parameters being higher than a first threshold;

determining to use a flag-based format in response to the one or more parameters being lower than a second threshold;

determining to use an indicated format in response to receiving the indicated format in the respective one of the one or more transmissions; and determining to use a preconfigured format in response to the preconfigured format being different from the indicated format.

10. A wireless device comprising processing circuitry configured to cause the wireless device to:

receive one or more transmissions from one or more transmitting devices, wherein the one or more transmissions comprise multiple transmissions, and receiving the one or more transmissions from the one or more transmitting devices further comprises one or more of:

receiving the multiple transmissions from multiple transmitting devices;

prioritizing the multiple transmissions based on one or more of:

a respective priority indicated in each of the multiple transmissions;

a respective target communication range indicated in each of the multiple transmissions; and a respective Reference Signal Received Power, RSRP, of a physical channel carrying each of the multiple transmissions; and prioritizing multiple resource coordination messages for the multiple transmitting devices to thereby avoid potential collision among the multiple resource coordination messages based on one or more of:

the respective target communication range indicated in each of the multiple transmissions; and the respective RSRP of the physical channel carrying each of the multiple transmissions;

determine whether to communicate a resource coordination message to a respective one of the one or more transmitting devices based on one or more parameters obtained from a respective one of the one or more transmissions received from the respective one of the one or more transmitting devices;

determine a format for the resource coordination message based on the one or more obtained parameters in response to determining to communicate the resource coordination message; and transmit the resource coordination message to the respective one of the one or more transmitting devices in the determined format.

*     *     *     *     *